US012203820B2

(12) United States Patent
Maenz et al.

(10) Patent No.: US 12,203,820 B2
(45) Date of Patent: Jan. 21, 2025

(54) SIMULATION DEVICE FOR THE SCREW JOINT SIMULATION OF A SCREW-DRIVING TOOL

(71) Applicant: KISTLER HOLDING AG, Winterthur (CH)

(72) Inventors: Benjamin Maenz, Schwelm (DE); Gerald Neumann, Hueckeswagen (DE); Jochen Schneider, Schorndorf (DE)

(73) Assignee: Kistler Holding AG, Winterthur (CH)

( * ) Notice: Subject to any disclaimer, the term of this patent is extended or adjusted under 35 U.S.C. 154(b) by 263 days.

(21) Appl. No.: 17/860,424

(22) Filed: Jul. 8, 2022

(65) Prior Publication Data
US 2023/0017978 A1    Jan. 19, 2023

(30) Foreign Application Priority Data

Jul. 14, 2021 (EP) .................................. 21185633

(51) Int. Cl.
*G01L 25/00* (2006.01)
*B25B 21/00* (2006.01)
*B25B 23/147* (2006.01)
*G01L 5/24* (2006.01)

(52) U.S. Cl.
CPC ............ *G01L 25/003* (2013.01); *B25B 21/00* (2013.01); *B25B 23/147* (2013.01); *G01L 5/24* (2013.01)

(58) Field of Classification Search
CPC ......... G01L 25/003; G01L 5/24; B25B 21/00; B25B 23/147
See application file for complete search history.

(56) References Cited

U.S. PATENT DOCUMENTS

| 5,886,246 A | 3/1999 | Bareggi et al. |
| 6,595,034 B1 * | 7/2003 | Crane ................... G01L 25/003 73/1.12 |
| 2010/0116067 A1 * | 5/2010 | Chiapuzzi ............. G01L 25/003 73/862.325 |

(Continued)

FOREIGN PATENT DOCUMENTS

| CN | 112 556 922 A | 3/2021 |
| JP | 2005-351683 A | 12/2005 |

(Continued)

OTHER PUBLICATIONS

Translation of CN112556922.*
Japanese Office Action, Oct. 19, 2023, 7 pages.
EPO Search Report, Jan. 14, 2022, 8 pages.

*Primary Examiner* — Helen C Kwok
(74) *Attorney, Agent, or Firm* — Dority & Manning, P.A.

(57) ABSTRACT

A simulation device for the screw joint simulation of a nutrunner includes a test connecting element rigidly connected to a brake unit. The nutrunner can be coupled to the test connecting element and activated to exert a torque that rotates the test connecting element about an axis of rotation. Activation of the brake unit brakes the test connecting element. A torque transducer includes a rotational angle transducer for measuring a rotational angle by which the test connecting element rotates about the rotation axis. The simulation device includes a zero mark, and the brake unit can be adjusted to a zero angle with respect to the zero mark.

12 Claims, 8 Drawing Sheets

(56) References Cited

U.S. PATENT DOCUMENTS

| | | | | |
|---|---|---|---|---|
| 2011/0184666 | A1* | 7/2011 | Imai | G01L 5/24 |
| | | | | 702/43 |
| 2017/0356821 | A1* | 12/2017 | Sartori | G01L 25/003 |
| 2018/0136070 | A1* | 5/2018 | Boccellato | G01L 25/003 |
| 2020/0150615 | A1* | 5/2020 | Jousset | B25B 21/004 |
| 2020/0166426 | A1* | 5/2020 | Childers | G01L 3/20 |
| 2020/0324397 | A1* | 10/2020 | Brunner | B23P 19/066 |
| 2020/0386637 | A1* | 12/2020 | Cattaneo | G01L 3/20 |
| 2021/0191357 | A1* | 6/2021 | Jousset | B25B 23/14 |
| 2021/0318197 | A1* | 10/2021 | Cazzulani | G01M 99/007 |
| 2022/0221358 | A1* | 7/2022 | Neumann | G01L 5/24 |
| 2023/0008136 | A1* | 1/2023 | Neumann | G01L 5/24 |

FOREIGN PATENT DOCUMENTS

| | | | |
|---|---|---|---|
| JP | 2007-514559 A | 6/2007 | |
| WO | WO 2016/10315 0 A1 | 6/2016 | |
| WO | WO 2016/103147 A1 | 6/2016 | |

* cited by examiner

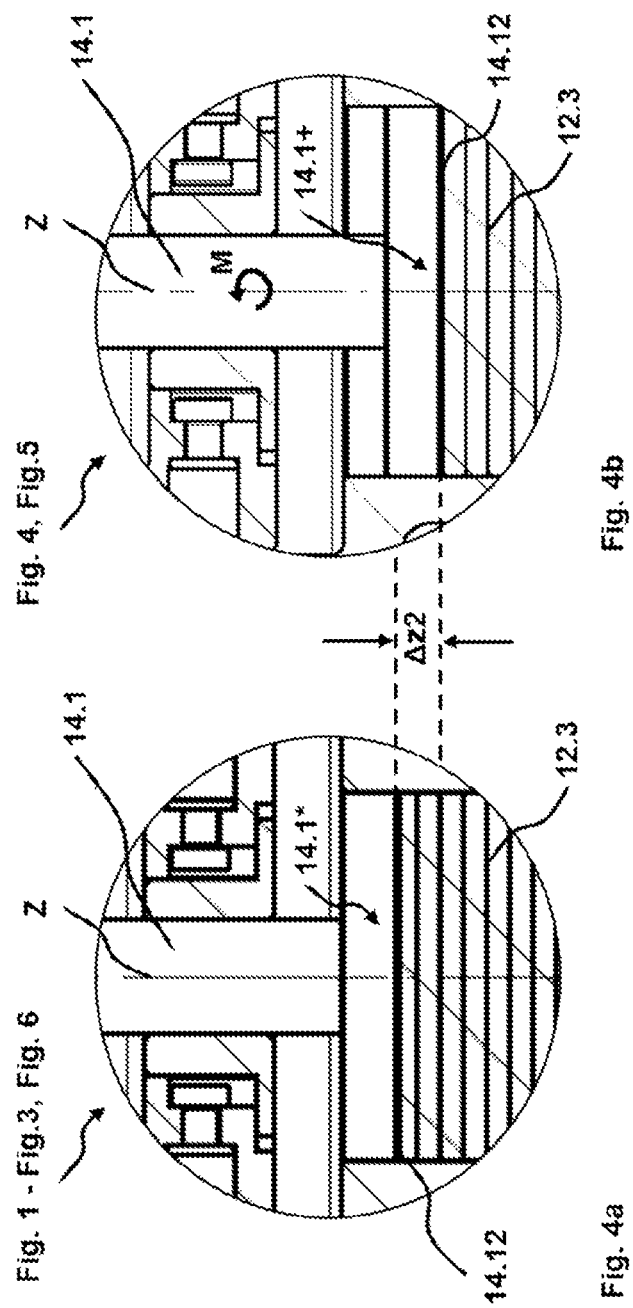

SIMULATION DEVICE FOR THE SCREW JOINT SIMULATION OF A SCREW-DRIVING TOOL

TECHNICAL FIELD

The invention relates to a simulation device for the screw joint simulation of a screw-driving tool. The invention also relates to a method for carrying out the screw joint simulation of a screw-driving tool using the simulation device.

BACKGROUND OF THE INVENTION

According to the guideline VDI/VDE 2647 of February 2013, a screw-driving tool is both a motor-driven screw-driving tool and a manually operated torque wrench. The screw-driving tool can be activated, and the activated screw-driving tool rotates about a rotation axis, and thereby exerts a torque onto a connecting element.

The connecting element comprises a thread and is a bolt, a nut, and the like. The connecting element is used to connect components. The connection is made by a clamping force between the components. The clamping force ensures that the components can be used under maximum operating forces.

Thus, the torque exerted by the activated screw-driving tool serves to generate the clamping force. For this purpose, the screw-driving tool increases the exerted torque over time and/or increases the exerted torque via the angle of rotation. The increase in exerted torque takes place up to a nominal torque specific for the clamping force and/or up to a nominal angle of rotation specific for the clamping force. The nominal torque and/or the nominal angle of rotation is/are predefined and can be set on the screw-driving tool. In the following explanation, the nominal torque and/or the nominal angle of rotation will be referred to as the nominal value.

The nutrunner is equipped with an indicator system. As soon as the nominal value is reached, the application of torque by the screw-driving tool is deactivated. The indicator system may work according to different functional principles. For example, a click-type torque wrench automatically interrupts the application of torque once the nominal value is achieved. An acoustic torque wrench automatically triggers an acoustic or optical signal when the nominal value is reached. An indicating screw-driving tool displays the current exerted torque and/or the current nominal angle of rotation on a scale or an electronic screen.

A screw-driving tool of the aforementioned type is used in many industrial manufacturing processes. In order to ensure that the screw-driving tool actually achieves the set nominal value, the performance of the screw-driving tool is tested at intervals.

For this purpose, the guideline VDI/VDE 2647 of February 2013 specifies what should be tested and how. The screw-driving tool performance test is referred to as screw joint simulation. The screw joint simulation is carried out using a simulation device comprising a test connecting element, a brake unit and a measuring unit. The screw-driving tool is coupled to the simulation device via the test connecting element. The test connecting element is able to rotate about an axis of rotation. The brake unit and the test connecting element are mechanically connected to each other. The measuring unit is arranged between the test connecting means and the brake unit. The measuring unit comprises a torque transducer and a rotational angle transducer.

The screw-driving tool coupled to the simulation device is activated and exerts a torque onto the test connecting element. The applied torque causes the test connecting element to start rotating about the axis of rotation. The brake unit is activated and brakes the test connecting element. The torque transducer measures the torque and the rotational angle transducer measures the angle of rotation by which the test connecting element rotates about the axis of rotation.

Such a simulation device is known from WO2016/103150A1, which corresponds to US Patent Application Publication No. 2017-0363500, which is hereby incorporated herein in its entirety by this reference for all purposes. The brake unit comprises a brake disc and brake pads. The brake disc is mechanically connected to the test connecting element while the brake pads are arranged in a stationary manner. The brake unit operates hydraulically and comprises a hydraulic pump and brake pistons. The hydraulic pump pumps a brake fluid to act onto the brake pistons, and the brake pistons act in frictional engagement onto the brake disc and brake the test connecting element.

Procurement and maintenance of a hydraulic brake unit of the aforementioned type is expensive so that the simulation device is also expensive.

OBJECTS AND SUMMARY OF THE INVENTION

It is an object of the present invention to provide a cost-efficient simulation device for the screw joint simulation of a screw-driving tool.

This object and others have been achieved by the features described hereinafter.

The invention relates to a simulation device for the screw joint simulation of a screw-driving tool comprising a test connecting unit by which the screw-driving tool can be coupled to the simulation device, wherein the screw-driving tool can be activated and, in the activated state and coupled to the test connecting unit, rotates the test connecting unit about an axis of rotation and exerts a torque onto the test connecting unit; comprising a measuring unit for measuring the torque that the screw-driving tool in the activated state and coupled to the test connecting unit exerts on the test connecting unit, and for measuring the angle of rotation by which the test connecting unit rotates about the axis of rotation when coupled to the activated screw-driving tool; and comprising a brake unit for slowing down the torque that the screw-driving tool in the activated state and coupled to the test connecting unit exerts on the test connecting unit; wherein the simulation device comprises a converter unit, which converter unit is mechanically connected to the test connecting unit, which converter unit captures the torque that the screw-driving tool in the activated state and coupled to the test connecting unit exerts on the test connecting unit, and converts said torque into a braking force and applies the braking force to the brake unit.

The invention also relates to a method for carrying out the screw joint simulation of a screw-driving tool using the simulation device according to the independent claim, which method comprises the following steps: in a first step, a nominal value is set at the screw-driving tool and the screw-driving tool is coupled to the simulation device via the test connecting unit; in a third step, the screw-driving tool is activated, which activated screw-driving tool rotates the test connecting unit about the axis of rotation and exerts a torque onto the test connecting unit; wherein, in the third step, the torque exerted by the screw-driving tool is captured by the converter unit and is converted into a braking force;

and wherein, in the third step, the braking force is applied to said brake unit by the converter unit.

Thus, in contrast to the prior art as described in WO2016/103150A1, the simulation device according to the preset invention no longer requires a hydraulic brake unit making the device cost-effective. Instead, the torque exerted by the screw-driving tool is received by a converter unit and converted into a braking force. This braking force is applied to the brake unit.

Further embodiments of the subject matter of the invention are described hereinafter.

BRIEF DESCRIPTION OF THE SEVERAL VIEWS OF EXEMPLARY DRAWINGS

In the following, the invention will be explained in more detail by way of example with reference to the figures in which.

Figure 1:
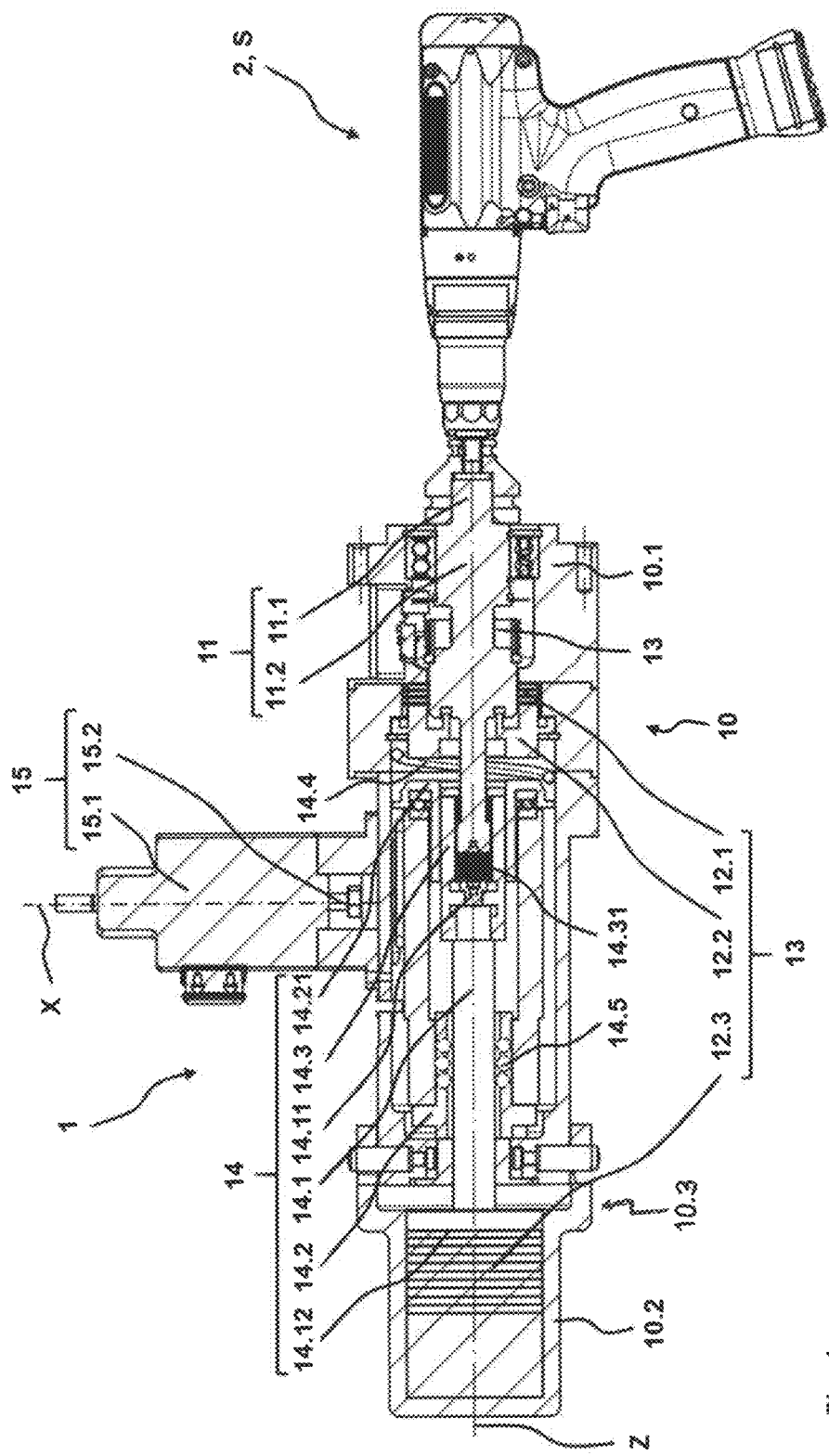
FIG. 1 shows a longitudinal section of the simulation device 1 with the screw-driving tool 2 coupled thereto.
Figure 2:
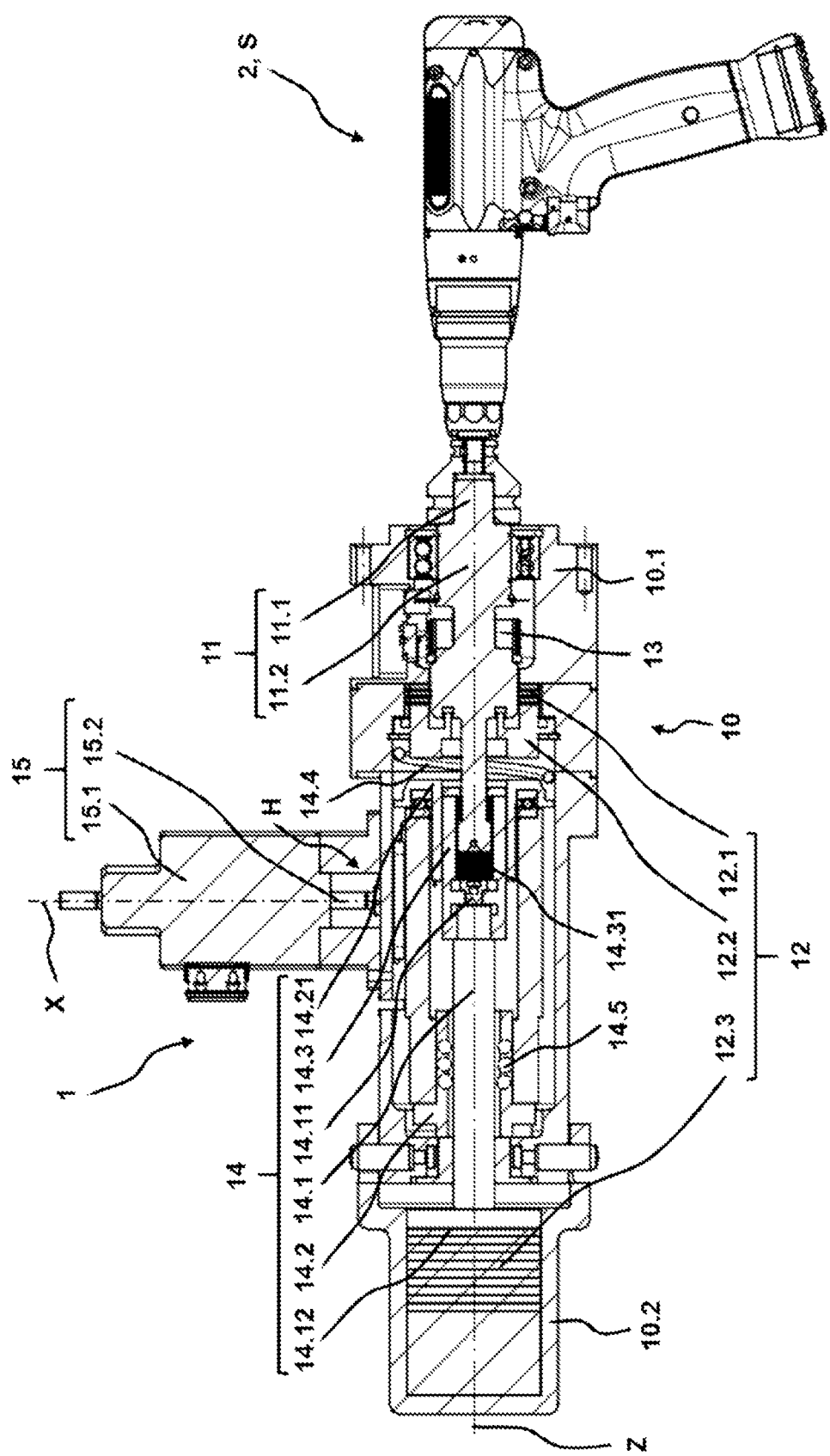
FIG. 2 shows the longitudinal section according to FIG. 1 in which the screw-driving tool 2 and the retaining unit 15 are activated.
Figures 3A, 3B:
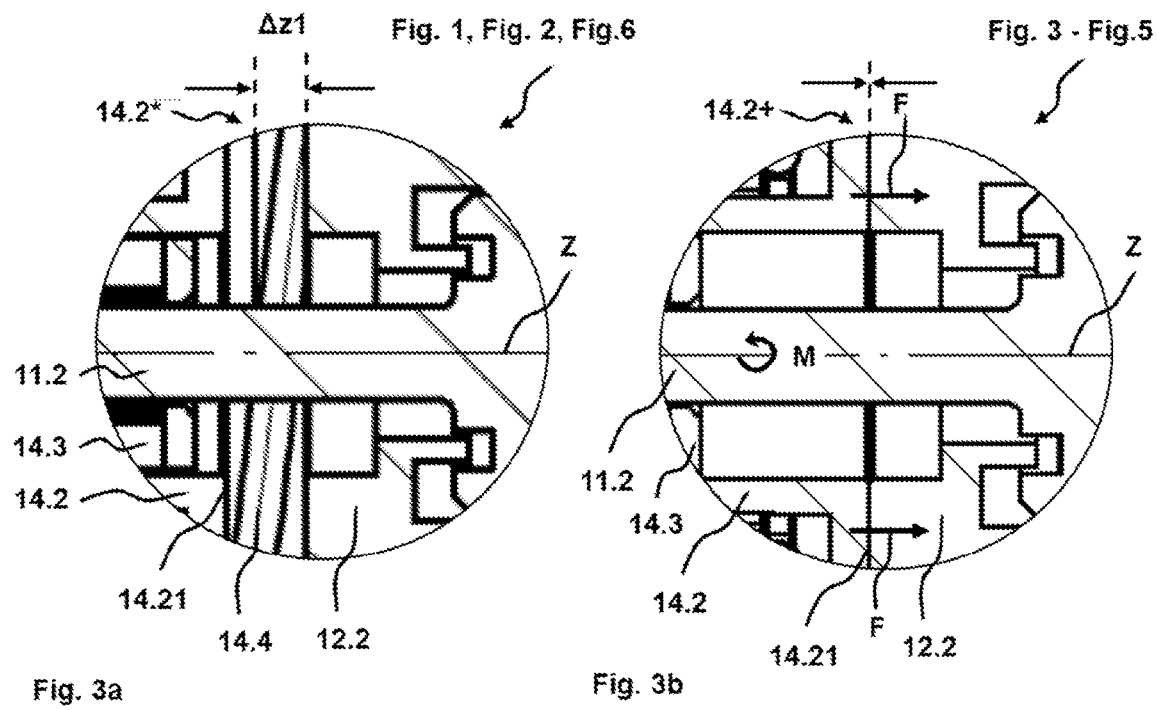
FIG. 3 shows a longitudinal section according to FIG. 2 with the converter unit 14 in mechanical contact to the brake unit 12.
Figure 3:
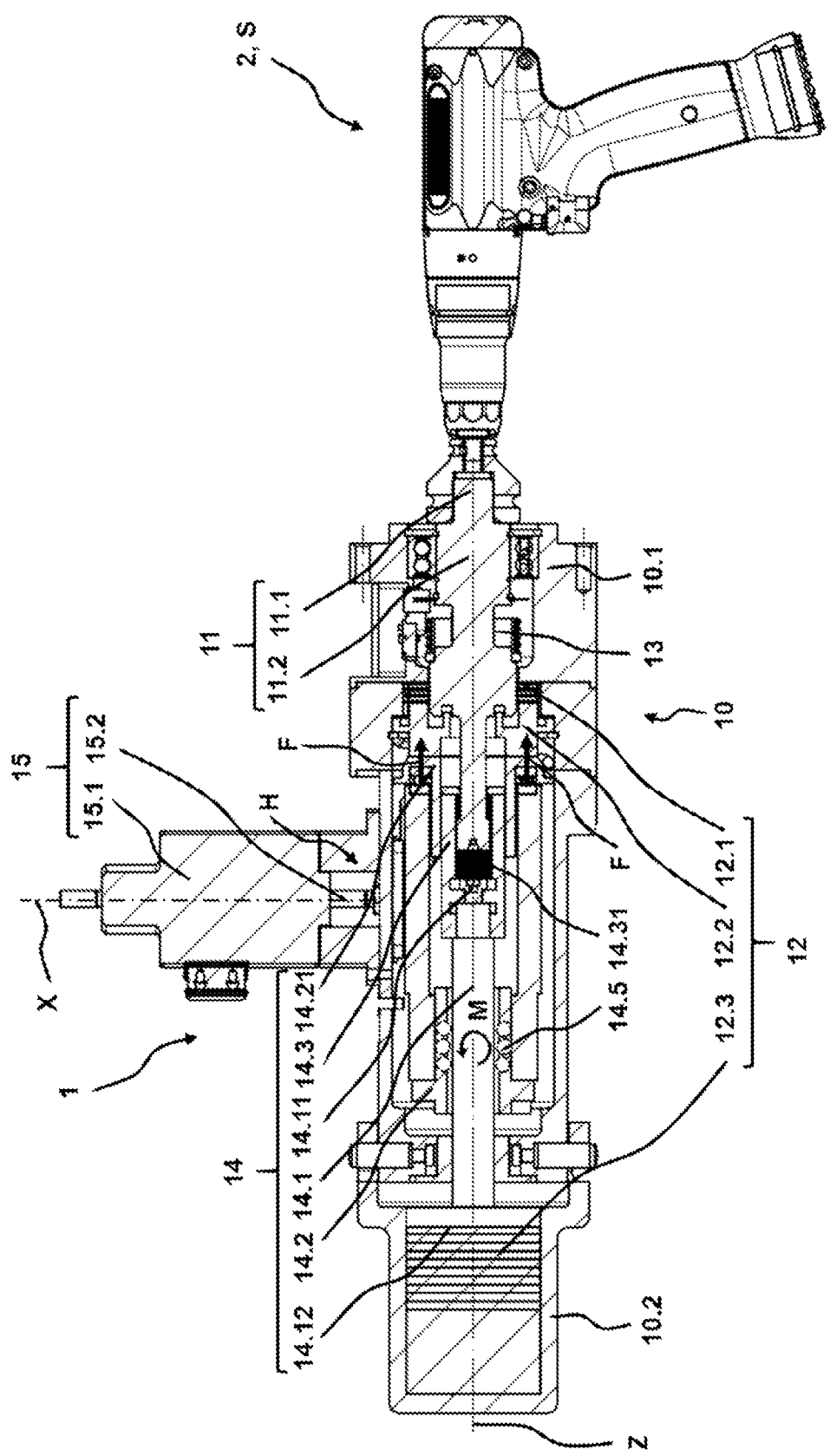
Figure 4:
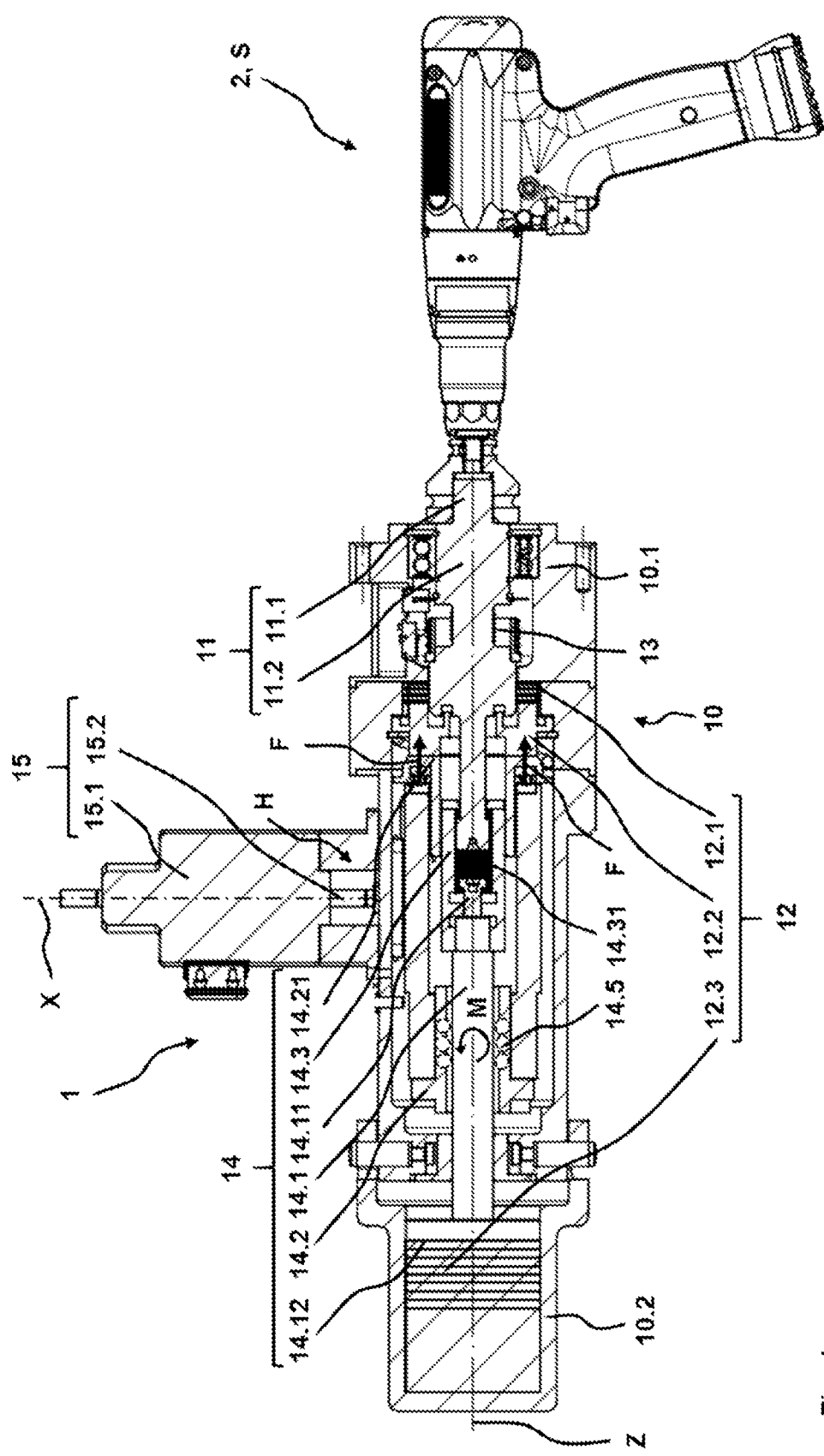
Figure 5:
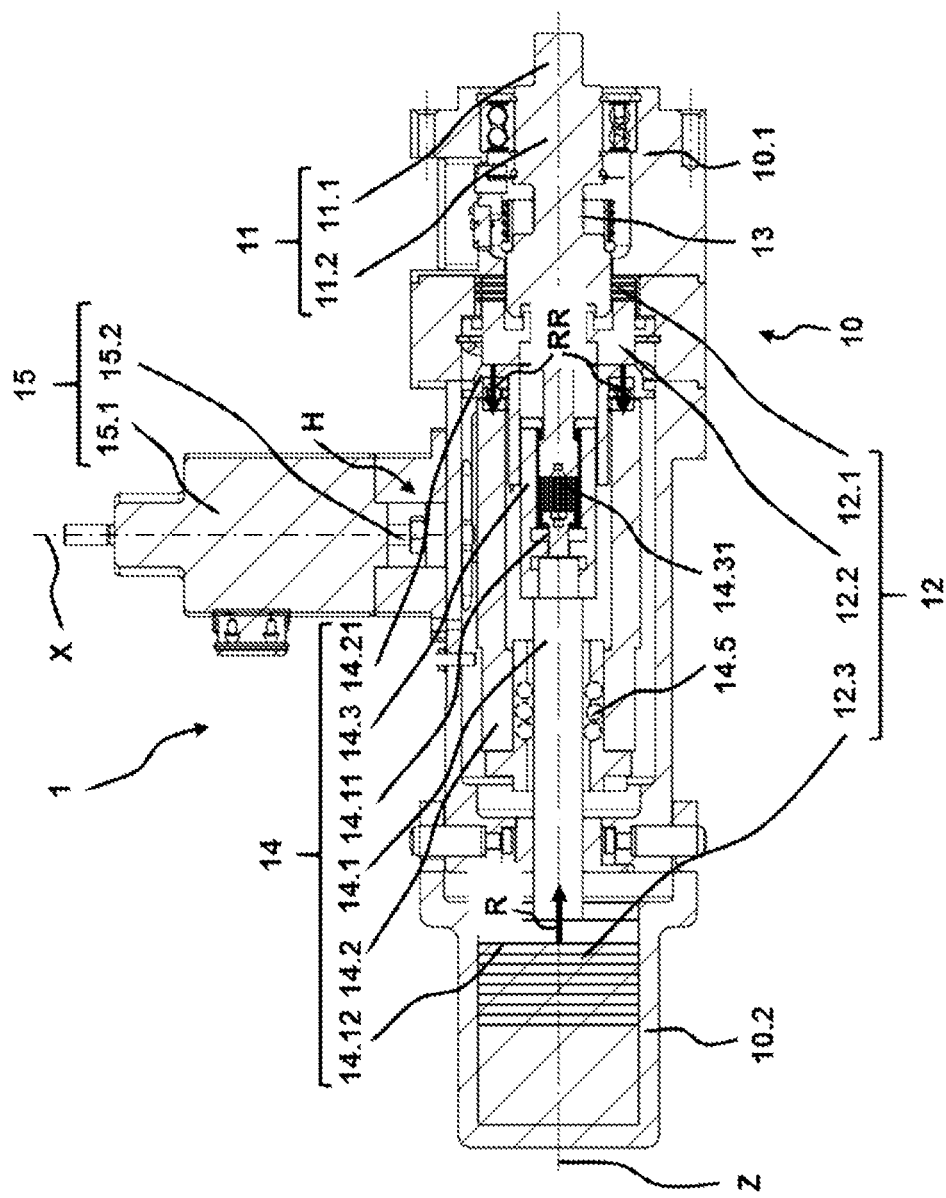
Figure 6:
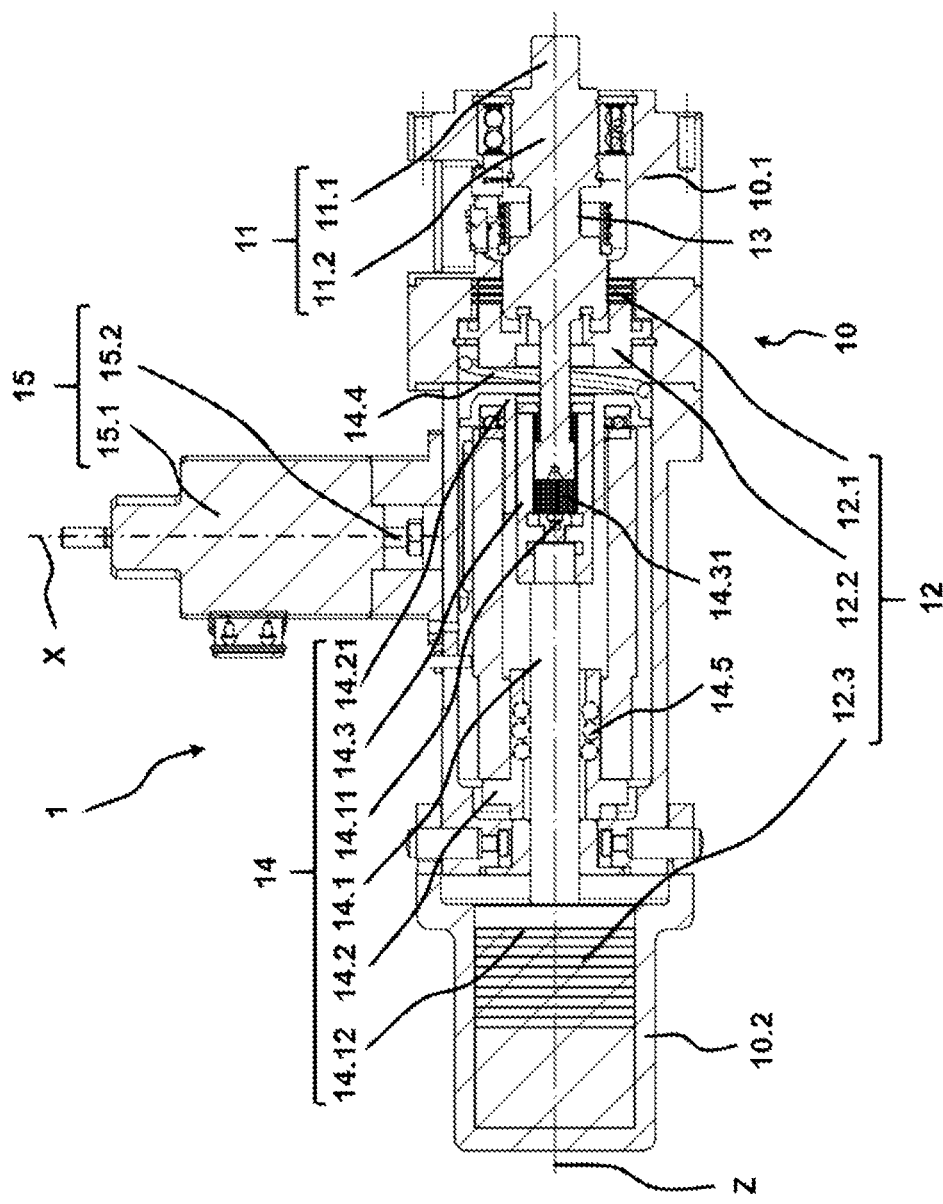

FIG. 3a shows an enlarged section of the converter unit 14 according to FIGS. 1, 2 and 6 not in mechanical contact to the brake unit 12;

FIG. 3b shows an enlarged section of the converter unit 14 according to FIGS. 3 to 5 in mechanical contact to the brake unit 12;

FIG. 4 shows the longitudinal section according to FIG. 3 with brake spring elements 12.3 of the brake unit 12 compressed by the converter unit 14;

FIG. 4a shows an enlarged section of the non-compressed brake spring elements 12.3 of the brake unit 12 according to FIGS. 1 to 3 and 6;

FIG. 4b shows an enlarged section of the compressed brake spring elements 12.3 of the brake unit 12 according to FIGS. 4 and 5;

FIG. 5 shows the longitudinal section according to FIG. 4 with the screw-driving tool 2 uncoupled; and FIG. 6 shows the longitudinal section according to FIG. 5 with deactivated retaining unit 15.

Throughout the figures, identical reference numerals refer to identical objects.

DETAILED DESCRIPTION OF EXEMPLARY EMBODIMENTS OF THE INVENTION

FIGS. 1 to 6 show a longitudinal section through a presently preferred embodiment of the simulation device 1 for the screw joint simulation of a screw-driving tool 2. The longitudinal section is made along an axis of rotation Z. FIGS. 2a, 2b, 3a, 3b, 4a and 4d show enlarged sections of FIGS. 1 to 6.

According to the guideline VDI/VDE 2647 of February 2013, the nutrunner 2 is a motor-driven screwdriving tool, which desirably is configured for hand-held operation in one or more of the user's hands. The nutrunner can be activated, and the activated nutrunner continuously rotates about an axis of rotation Z and exerts a torque.

According to the guideline VDI/VDE 2647 of February 2013, the screw-driving tool 2 is a motor-driven screw-driving tool or a manually operated torque wrench. The screw-driving tool 2 can be activated, and depending on the screw joint the activated screw-driving tool 2 rotates continuously and/or discontinuously about the axis of rotation Z and exerts a torque M, which is schematically indicated by the curved arrow in FIGS. 3, 3b 4 and 4b for example.

In the course of the screw joint simulation, screw-driving tool 2 increases the exerted torque M over time and/or increases the exerted torque M via the angle of rotation. The increase in exerted torque M takes place up to a nominal torque and/or up to a nominal angle of rotation. The nominal torque and/or the nominal angle of rotation is/are predefined and can be set on the screw-driving tool 2. In the following explanation, the nominal torque and/or the nominal angle of rotation is/are also referred to as the nominal value S.

The screw-driving tool 2 is equipped with an indicator system. As soon as the nominal value S is reached during the screw joint simulation, the screw-driving tool 2 stops applying the torque M. The indicator system may operate according to different functional principles. The screw-driving tool 2 may be a click-type torque wrench, which automatically releases itself when the nominal torque is reached. The screw-driving tool 2 may be an acoustic torque wrench, which automatically triggers an acoustic or optical signal when the nominal torque is reached. The screw-driving tool 2 may be an indicating screw-driving tool that displays the applied torque M on a scale or on an electronic screen.

The essential components of a presently preferred embodiment of the simulation device 1 include a test connecting unit 11, a brake unit 12, a measuring unit 13, a converter unit 14, and a retaining unit 15.

The simulation device 1 comprises a housing generally designated by the numeral 10 in FIGS. 1-6. Said housing 10 desirably includes multiple parts, which include a proximal housing part 10.1 and a distal housing part 10.2. A housing end close to the screw-driving tool is located at the proximal housing part 10.1, and a housing end that is configured to be disposed remotely from the screw-driving tool is located at the distal housing part 10.2. Housing 10 desirably is configured as a hollow cylindrical shape and extends along the axis of rotation Z. Housing 10 defines a cavity in the interior of the housing 10. Said cavity extends along the axis of rotation Z from the proximal housing part 10.1 to the distal housing part 10.2. Housing 10 serves several functions, for example, it protects the essential components of the simulation device 1 from mechanical damage and, furthermore, provides mechanical stability to the simulation device 1 against deflection along the axis of rotation Z and torsion about the axis of rotation Z during the performance of the screw joint simulation.

The test connecting unit 11 is designed to enable coupling of the screw-driving tool 2 to the simulation device 1 for performing the screw joint simulation. The test connecting unit 11 desirably is configured cylindrical in shape and extends along the axis of rotation Z. The test connecting unit 11 comprises a test connecting element 11.1 at one free end thereof and a rotating body 11.2 contiguous with the test connecting element 11.1. Preferably, the test connecting element 11.1 and the rotating body 11.2 are formed as a unitary structure that can be manufactured in one piece. The test connecting element 11.1 is arranged at the housing end of the proximal housing part 10.1 that is close to the screw-driving tool 2. The test connecting element 11.1 is accessible from the outside through an opening in the proximal housing part 10.1. The test connecting element 11.1 is formed according to standard specifications and is for example square in shape. The screw-driving tool 2 is coupled to the simulation device 1 via the test connecting element 11.1. The coupling desirably is configured to be selectively releasable by the user. The rotating body 11.2 is rotatably mounted in the cavity of the proximal housing part 10.1.

The brake unit 12 is arranged in the cavity that is defined in the interior of the housing 10. The brake unit 12 comprises a plurality of brake plate elements 12.1, a brake piston 12.2 and a plurality of brake spring elements 12.3. Said brake unit 12 has the function of slowing down, i.e., decelerating, the torque M exerted by the screw-driving tool 2 during the screw joint simulation.

The brake plate elements 12.1 are arranged closer to the screw-driving tool 2, and the brake piston 12.2 is arranged further away from screw-driving tool 2 as seen along the axis of rotation Z. In a presently preferred embodiment, said brake plate elements 12.1 comprise a plurality of first brake plate elements attached to the proximal housing part 10.1 and a plurality of second brake plate elements attached to the rotating body 11.2. The brake plate elements 12.1 are annular in shape. Each of the plurality of first brake plate elements is arranged alternatingly along the axis of rotation Z with respect to each of the plurality of second brake plate elements. The brake piston 12.2 is arranged within the cavity of the housing 10 at the proximal housing part 10.1. The brake piston 12.2 comprises a distal end disposed relatively remotely from the screw-driving tool and a proximal end disposed relatively close to the screw-driving tool 2. With the proximal end that is close to the screw-driving tool, the brake piston 12.2 is in direct mechanical contact with the brake plate elements 12.1. A braking force F can be applied to the brake piston 12.2 via the distal end that is remotely disposed from the screw-driving tool 2 (see FIGS. 3 and 4). The brake piston 12.2 to which the braking force F is applied is movable along the axis of rotation Z in the direction towards the screw-driving tool 2. Said brake piston 12.2 to which the braking force F is applied brings about frictional engagement of the brake plate elements 12.1 with each other. The frictionally engaged brake plate elements 12.1 lower the torque M that is exerted by the screw-driving tool 2.

The brake spring elements 12.3 are arranged at the housing end remote from the screw-driving tool 2 in the portion of the cavity defined by the distal housing part 10.2, which alternatively is called the housing pot 10.2. The brake spring elements 12.3 are secured in the housing pot 10.2. Preferably, the brake spring elements 12.3 are disc springs. The brake spring elements 12.3 are compressible along the axis of rotation Z. The number of brake spring elements 12.3 and/or the stiffnesses of the brake spring elements 12.3 arranged in the housing pot 10.2 varies depending on the nominal value S (nominal torque and/or nominal angle of rotation). The housing pot 10.2 comprises a quick-release mechanism, which is schematically indicated by the numeral 10.3 in FIG. 1. A suitable quick-release mechanism would include a fastener such as a bayonet lock and the like, to selectively connect the housing pot 10.2 at the distal end of the housing 10 to enable the user to effect quick and easy replacement of the brake spring elements 12.3 to accommodate the simulation device 1 to the requirements of the nominal value S of the screw-driving tool 2.

The measuring unit 13 is arranged in the cavity of the proximal housing part 10.1. Said measuring unit 13 comprises a torque transducer and a rotational angle transducer. The torque transducer is designed to measure the torque M exerted by the screw-driving tool 2 during the screw joint simulation. The torque transducer is attached to the rotating body 11.2. In a presently preferred embodiment, the torque transducer is a strain gauge. The strain gauge detects an elongation or compression of the rotating body 11.2 caused by the torque M. The rotational angle transducer is designed to measure the angle of rotation by which the test connecting unit 11 rotates about the axis of rotation Z during the screw joint simulation. The rotational angle transducer desirably comprises a sensor element and a measuring disc. The sensor element desirably is attached to the proximal housing part 10.1 while the measuring disc desirably is attached to the rotating body 11.2. In a presently preferred embodiment, the measuring disc comprises angle marks, and the sensor element detects the angle marks rotating about the axis of rotation Z during the screw joint simulation.

A major portion of the converter unit 14 desirably is arranged in the cavity of the proximal housing part 10.1, while a minor portion of the converter unit 14 is arranged desirably in the cavity of the housing pot 10.2. The converter unit 14 desirably comprises a spindle 14.1, a nut 14.2, a bushing 14.3 and a return spring element 14.4. The converter unit 14 is attached to the test connecting unit 11. It is the function of the converter unit 14 to capture, i.e., detect, the torque M exerted by the screw-driving tool 2 during the screw joint simulation and to convert the detected torque M into a braking force F and to apply the braking force F to the brake unit 12.

The spindle 14.1 desirably is cylindrical in shape and extends along the axis of rotation Z. The nut 14.2 desirably is hollow cylindrical in shape and is arranged on the circumference of the spindle 14.1. When viewed in a plane disposed perpendicular to the axis of rotation Z, the nut 14.1 is seen to completely surround the circumference of the spindle 14.1. Spindle 14.1 and nut 14.2 desirably are connected to each other by a form fit. The form fit converts a rotational movement of the spindle 14.1 about the axis of rotation Z into a longitudinal movement of the nut 14.2 along the axis of rotation Z. In a presently preferred embodiment, the spindle 14.1 and nut 14.2 form a ball screw drive, a roller gear drive, and the like. In these cases, the spindle 14.1 is a threaded spindle and the nut 14.2 is a threaded nut. Rolling elements 14.5 such as balls or rollers generate the form fit between the threaded spindle and the threaded nut. In FIGS. 1 to 6, the rolling elements 14.5 are schematically shown as dashed circles. The threaded spindle defines a track on its circumference. The threaded nut defines a return. The rolling elements 14.5 move in the track of the threaded spindle and in the return of the threaded nut. The rolling elements 14.5 convert a rotational movement of the threaded spindle about the axis of rotation Z into a movement of the threaded nut along the axis of rotation Z. Since the rolling friction of the rolling elements 14.5 is very low, the ball screw drive or roller gear drive is not self-locking.

The bushing 14.3 is connected to the rotating body 11.2 by a mechanical connection 14.31. The mechanical connection 14.31 transmits the torque M exerted by the screw-driving tool 2 from the rotating body 11.2 to the bushing 14.3. Preferably, the mechanical connection 14.31 desirably is a tooth system, i.e., a splined connection, in which the bushing 14.3 and the rotating body 11.2 are provided with teeth which are interleaved so as engage each other forming the tooth system.

The spindle 14.1 has a proximal end positioned close to the screw-driving tool 2 along the axis of rotation Z. At the proximal end that is close to the screw-driving tool 2, the spindle 14.1 is attached to the bushing 14.3 via a further mechanical connection 14.11. The further mechanical connection 14.11 transmits the torque M exerted by the screw-driving tool 2 from the bushing 14.3 to the spindle 14.1. In a presently preferred embodiment, the further mechanical connection 14.11 desirably is achieved by a feather key-screw connection. In this case, the screw connects the spindle 14.1 and the bushing 14.3 to each other and the feather key secures this connection. The screw comprises a thread having a thread pitch. Under the effect of the torque M exerted by the screw-driving tool 2 and depending on the thread pitch, the screw is movable along the axis of rotation Z and leads to a longitudinal movement of the bushing 14.3 in the direction away from the screw-driving tool 2 in a magnitude that is less than or equal to 10 mm.

The return spring element 14.4 desirably is arranged at the proximal housing part 10.1. In a presently preferred embodiment, a proximal end of said return spring element 14.4 that is disposed close to the screw-driving tool 2 is in mechanical contact to the proximal housing part 10, while a distal end of the return spring element 14.4 that is disposed relatively remote from the screw-driving tool 2 is in mechanical contact to the nut 14.2.

Seen along the axis of rotation Z, the nut 14.2 is arranged further away from the screw-driving tool 2 than the return spring element 14.4 and the brake piston 12.2. Nut 14.2 comprises a bearing and a pressure sleeve 14.21 at its end close to the screw-driving tool. The bearing serves to prevent the nut 14.1 from jamming during the movement along the axis of rotation Z mediated by the rolling elements 14.5. The nut 14.2 is in mechanical contact to the return spring element 14.4 and to the brake piston 12.2 by the pressure sleeve 14.21. For this purpose, pressure sleeve 14.21 comprises a contact surface extending in a plane perpendicular to the axis of rotation Z. The mechanical contact is made both to the return spring element 14.4 and to the brake piston 12.2.

The retaining unit 15 is arranged at the housing 10. Retaining unit 15 comprises a drive 15.1 and a retaining element 15.2. The retaining unit 15 is designed to retain the nut 14.2 for a directed movement along the axis of rotation Z in the direction towards the screw-driving tool 2.

The drive 15.1 desirably is attached to the outside of the proximal housing part 10.1. Preferably, the drive 15.1 is a solenoid. The drive 15.1 and the retaining element 15.2 are mechanically connected to each other. Drive 15.1 and retaining element 15.2 extend along a radial axis X. The radial axis X is perpendicular to the axis of rotation Z. The retaining element 15.2 projects through an external opening of the housing 10 into the cavity of the housing 10. The retaining element 15.2 preferably comprises a feather key.

Figures 2A, 2B:
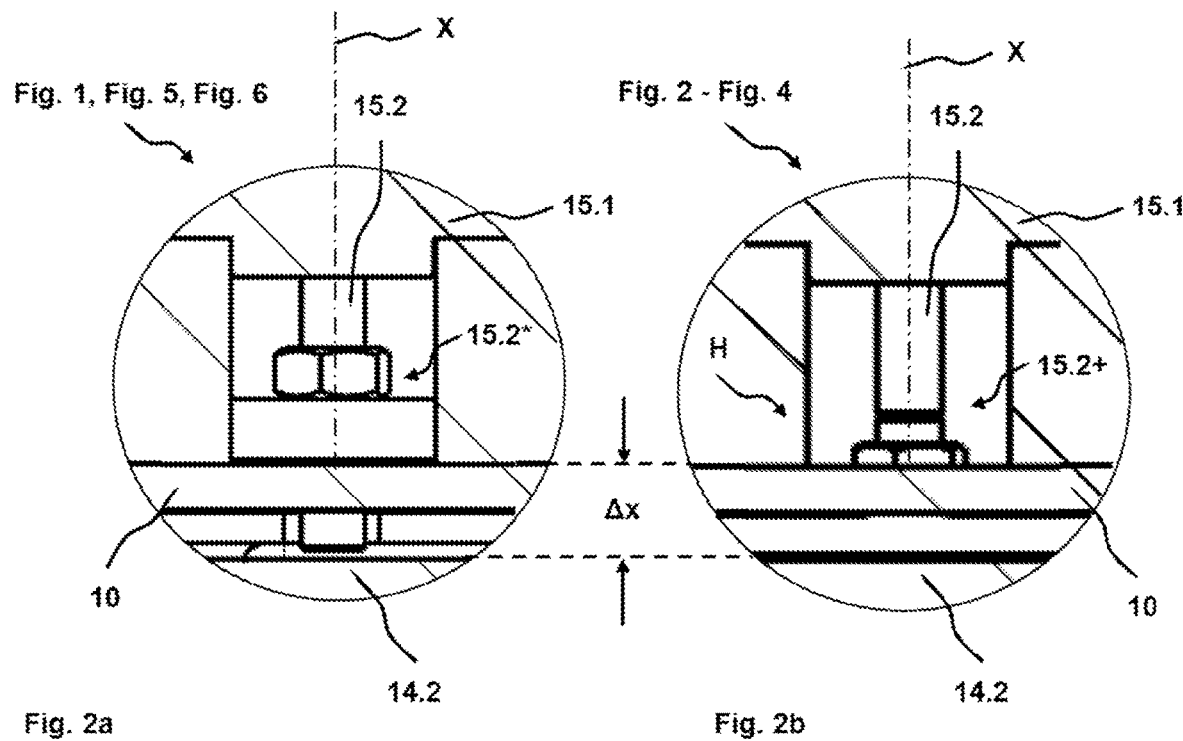
FIG. 2a shows an enlarged section of the non-activated retaining unit 15 according to FIGS. 1, 5 and 6.
FIG. 2b shows an enlarged section of the activated retaining unit 15 according to FIGS. 2 to 4.

The retaining unit 15 desirably is configured so that it can be selectively activated and deactivated at the option of the user. When the retaining unit 15 is activated, drive 15.1 moves the retaining element 15.2 between a resting position 15.2* and a retaining position 15.2+. FIG. 2a shows the retaining element 15.2 in the resting position 15.2*. FIG. 2b shows the retaining element 15.2 that has been moved by the drive 15.1 by a travel distance Δx along the radial axis X towards the nut 14.2. Now, the retaining element 15.2 is in a retaining position 15.2+. In the retaining position 15.2+, the retaining element 15.2 is in direct mechanical contact to said nut 14.2. Preferably, the travel distance Δx along the radial axis X is less than or equal to 10 mm. The retaining element 15.2 that is in mechanical contact to the nut 14.2 in the retaining position 15.2+ desirably holds the nut 14.2 by means of a form fit (see FIGS. 2 to 4).

During a rotational movement of the spindle 14.1 about the axis of rotation Z, this holding H schematically shown in FIGS. 2, 2b, 3, 4, and 5 desirably is achieved by form fit and prevents the nut 14.2 from moving along the axis of rotation Z in the direction away from the screw-driving tool 2. However, the configuration of this holding H by form fit allows a movement of the nut 14.2 along the axis of rotation Z in the direction towards the screw-driving tool 2. FIG. 3a shows the nut 14.2 in a nut starting position 14.2*. From the nut starting position 14.2*, the nut 14.2 can travel a nut stroke Δz1 along the axis of rotation Z of preferably less than or equal to 25 mm in the direction towards the screw-driving tool 2. However, the movement of the nut 14.2 along the axis of rotation Z in the direction towards the screw-driving tool 2 is limited by the brake piston 12.2. The nut 14.2 travels said nut stroke Δz1 along the axis of rotation Z and is then positioned in a nut end position 14.2+ with respect to the return spring element 14.4 and with respect to the brake piston 12.2. The pressure sleeve 14.21 compresses the return spring element 14.4 and applies a braking force F to the brake piston 12.2.

The spindle 14.1 has a distal end that is remote from the screw-driving tool 2 along the axis of rotation Z. At the distal end remote from the screw-driving tool 2, the spindle 14.1 comprises a spindle contact surface 14.12. Via the spindle contact surface 14.12, the spindle 14.1 is in direct mechanical contact to the brake spring elements 12.3 in the housing pot 10.2. The spindle contact surface 14.12 extends in a plane perpendicular to the axis of rotation Z.

Accordingly, when the nut 14.2 is in the nut end position 14.2+ and the screw-driving tool 2 continues to drive the spindle 14.1 to rotate about the axis of rotation Z, then said nut 14.2 and spindle 14.1 are mechanically loaded against each other. As shown in FIGS. 4a and 4b, the bushing 14.3 moves along the axis of rotation Z in the direction away from the screw-driving tool 2 under the effect of the torque M exerted by the screw-driving tool 2. As a result, the spindle 14.1 which is mechanically connected to said bushing 14.3 also moves along the axis of rotation Z in the direction away from the screw-driving tool 2. The spindle contact surface 14.12 leaves a spindle starting position 14.1* and moves along the axis of rotation Z into a spindle end position 14.1+ resulting in compression of the brake spring elements 12.3.

Nut 14.2 continues to apply the braking force F to the brake piston 12.2 even if the screw-driving tool 2 no longer exerts a torque M at the end of the screw joint simulation (see FIG. 5). This condition results from the fact that the nut 14.2 is still held H by form fit by the retaining unit 15.

At the end of the screw joint simulation, no more torque M is exerted by the screw-driving tool 2. However, only after deactivation of the retaining unit 15, in which case the retaining element 15.2 is moved by the drive 15.1 from the retaining position 15.2+ back into the resting position 15.2*, does the nut 14.2 cease being held H by form fit. Then, the brake spring elements 12.3 decompress, with this decompression resulting in a spring force R. Said spring force R acts onto the spindle 14.1 via the spindle contact surface 14.12. Bushing 14.3 and spindle 14.1 move under the influence of the spring force R along the axis of rotation Z in the direction towards the screw-driving tool 2. The spindle contact surface 14.12 leaves the spindle end position 14.1+ and automatically moves along the axis of rotation Z into the spindle starting position 14.1+ (see FIGS. 5 and 6). It is no longer necessary to take further time-consuming measures for resetting the simulation device 1, and the elimination of such resetting measures has the effect of making the procedure cost-effective.

When it is no longer held H by form fit, the return spring element 14.4 decompresses, and, due to a return spring force RR resulting from this decompression, causes the nut 14.2 to leave the nut end position 14.2+ and to automatically return into the nut starting position 14.2+ (see FIGS. 5 and 6). Advantageously, the amount of this return spring force RR is selected such that the nut 14.2 is caused to occupy the nut starting position 14.2+ very quickly under the effect of the return spring force RR, thereby making the procedure time-saving and economical.

Without the holding H by form fit, the frictional contact of the brake plate elements 12.1 is released and moves the brake piston 12.2 along the axis of rotation Z away from the brake plate elements 12.1.

Thus, the method for carrying out the screw joint simulation of the screw-driving tool 2 using the simulation device 1 comprises the following steps:

In a first step as depicted in FIG. 1, a nominal value S is set on the screw-driving tool 2 and the screw-driving tool 2 is coupled to the simulation device 1 via the test connecting unit 11. The screw-driving tool 2 is not yet activated and does not yet rotate around the axis of rotation Z and does not yet exert any torque M. The retaining element 15.2 resides in the resting position 15.2* (see FIG. 2a). The nut 14.2 is in the nut starting position 14.2* (see FIG. 3a). The spindle 14.1 is in the spindle starting position 14.1* (see FIG. 4a).

In a second step as depicted in FIG. 2, the screw-driving tool 2 is activated. Shortly (within 2 sec) after the activation of the screw-driving tool 2, the retaining unit 15 is activated and the retaining element 15.2 is moved by the drive 15.1 into the retaining position 15.2+, and the nut 14.2 is held H by means of form fit in the nut starting position 14.2* (see also FIGS. 2b and 3a). The spindle 14.1 is still in the spindle starting position 14.1* (see FIG. 4a).

In a third step as depicted in FIG. 3, the activated screw-driving tool 2 rotates about the axis of rotation Z and exerts a torque M. The test connecting element 11.1 coupled to the screw-driving tool 2 transmits the rotational movement about the axis of rotation Z via the rotating body 11.2 onto said bushing 14.3. The torque M is received by the converter unit 14 via the mechanical connection 14.31. The rotational movement about the axis of rotation Z is transmitted from the bushing 14.3 to the spindle 14.1. The rotational movement of the spindle 14.1 about the axis of rotation Z results in a movement of the nut 14.2 along the axis of rotation Z. The converter unit 14 converts the exerted torque M. Movement of the nut 14.2 along the axis of rotation Z in the direction away from the screw-driving tool 2 is prevented by holding H the nut 14.2 by means of a form fit. Thus, nut 14.2 performs a movement along the axis of rotation Z in the direction towards the screw-driving tool 2. Nut 14.2 leaves the nut starting position 14.1* and moves along the axis of rotation Z into the nut end position 14.2+ (see FIGS. 3a and 3b). The nut 14.2 moved into the nut end position 14.2+ converts the exerted torque M into the braking force F. Thus, the exerted torque M is converted in this manner by the converter unit 14 into the braking force F. Nut 14.2 being in the nut end position 14.2+ compresses the return spring element 14.4. Nut 14.2 being in the nut end position 14.2+ applies the braking force F to the brake piston 12.2. In this way, the converter unit 14 applies the braking force F to the brake unit 12. Said brake piston 12.2 on which the braking force F is applied can move along the axis of rotation Z and brings about a frictional contact of the brake plate elements 12.1 with each other. The brake plate elements 12.1 lower the torque M exerted by said screw-driving tool 2. Measuring unit 13 measures the torque M exerted by the screw-driving tool 2 and the angle of rotation by which the test connecting unit 11 rotates about the axis of rotation Z. The retaining element 15.2 remains in the retaining position 15.2+ (see FIG. 2b). The spindle 14.1 is still in the spindle starting position 14.1*.

In a fourth step as depicted in FIG. 4, said screw-driving tool 2 further increases the exerted torque M until the set nominal value S is achieved. The screw-driving tool 2 continues to rotate the spindle 14.1 about the axis of rotation Z. Since the nut 14.2 is in the nut end position 14.2+, nut 14.2 and spindle 14.1 are mechanically loaded against each other. As a result of this mechanical loading, bushing 14.3 moves the spindle 14.1 from the spindle starting position 14.1* into the spindle end position 14.1+ and compresses the brake spring elements 12.3 (see FIGS. 4a and 4b). Measuring unit 13 measures the torque M exerted by the screw-driving tool 2 and the angle of rotation by which the test connecting unit 11 rotates about the axis of rotation Z.

In a fifth step as depicted in FIG. 5, said screw-driving tool 2 has achieved the set nominal value S and deactivates the rotational movement of the test connecting unit 11 about the axis of rotation Z and the exertion of the torque M. The coupling of the screw-driving tool 2 to the test connecting element 11.1 is released. The screw-driving tool 2 is removed from the simulation device 1. The retaining element 15.2 remains in the retaining position 15.2+ (see FIG. 2b). The nut 14.2 remains in the nut end position 14.2+ (see FIG. 3b).

In a sixth step as depicted in FIG. 6, the retaining unit 15 is deactivated and the retaining element 15.2 is moved by the drive 15.1 from the retaining position 15.2+ back into the resting position 15.2*. The nut 14.2 is no longer held H by form fit. Without this holding H by form fit, return spring element 14.4 decompresses and exerts the return spring force RR onto the nut 14.2 which is moved along the axis of rotation Z into the nut starting position 14.2* (see FIGS. 5 and 6). Without this holding H by form fit, the frictional contact of the brake disc elements 12.1 to each other is released and moves the brake piston 12.2 along the axis of rotation Z away from the brake disc elements 12.1 (see FIGS. 5 and 6). At the same time, brake spring elements 12.3 decompress resulting in a spring force R. This spring force R causes the bushing 14.3 and the spindle 14.1 to move from the spindle end position 14.1+ along the axis of rotation Z back into the spindle starting position 14.1*; the bushing 14.3 and spindle 14.1 have reached this position in the depiction as shown in FIG. 6.

LIST OF REFERENCE NUMERALS 1 simulation device
2 screw-driving tool
10.1 proximal housing part
10.2 distal housing part
11 test connecting unit
12 brake unit
12.1 brake plate elements
12.2 brake piston
12.3 brake spring element
13 measuring unit
14 converter unit
14.1 spindle
14.1* spindle starting position
14.+ spindle end position
14.11 further mechanical connection 14.12 spindle contact surface
14.2 nut
14.2* nut starting position
14.2+ nut end position
14.21 pressure sleeve
14.3 bushing
14.4 return spring element
14.5 rolling elements
15 retaining unit
15.1 drive
15.2 retaining element
15.2* resting position
15.2+ retaining position
15.2 retaining element
$\Delta x$ travel distance
$\Delta z1$ nut stroke
$\Delta z2$ bushing stroke
F braking force
H holding by form fit
M torque
R spring force
RR return spring force
S nominal value
X radial axis
Z axis of rotation

What is claimed is:

1. A simulation device for a screw joint simulation of a screw-driving tool, the simulation device comprising:
    a test connecting unit configured for coupling the screw-driving tool to the simulation device in a manner whereby activation of the screw-driving tool rotates the test connecting unit about an axis of rotation and exerts a torque onto the test connecting unit;
    a measuring unit configured for measuring the torque that the screw-driving tool in an activated state and coupled to the test connecting unit exerts onto said test connecting unit and for measuring an angle of rotation by which the test connecting unit is rotated about the axis of rotation by the activated screw-driving tool in a coupled state;
    a brake unit configured for slowing down the torque that the screw-driving tool in the activated state and coupled to the test connecting unit exerts onto the test connecting unit; and
    a converter unit mechanically connected to the test connecting unit and including a plurality of rolling elements, wherein the converter unit includes a threaded spindle and a threaded nut connected to the spindle via a form fit that is generated by the plurality of rolling elements, wherein the plurality of rolling elements of the converter unit is configured to convert a rotational movement of the spindle about the axis of rotation into a longitudinal movement of the nut along the axis of rotation;
    wherein the converter unit is configured to detect the torque that the screw-driving tool in the activated state and coupled to the test connecting unit exerts onto the test connecting unit and wherein the converter unit is configured to convert the measured torque into a braking force and configured to apply the converted braking force to the brake unit.

2. The simulation device according to claim 1, further comprising a retaining unit configured to be activated to hold the nut by means of a form fit that only permits a longitudinal movement of the nut from a nut starting position into a nut end position along the axis of rotation in a direction towards the screw-driving tool.

3. The simulation device according to claim 2, the brake unit includes a plurality of brake plate elements and a brake piston that is disposed so that when the nut is moved in a longitudinal direction into the nut end position, then the braking force is applied to the brake piston so as to bring about frictional engagement of the plurality of brake plate elements with each other.

4. The simulation device according to claim 2, wherein the converter unit includes a return spring element that becomes compressed when the nut is moved in a longitudinal direction into the nut end position.

5. The simulation device according to claim 2, wherein the nut and the spindle are configured to become loaded against each other when the nut is moved in a longitudinal direction into the nut end position during a rotational movement of the spindle about the axis of rotation while the spindle moves in a longitudinal direction along the axis of rotation from a spindle starting position into a spindle end position; wherein the brake unit includes a plurality of brake spring elements that are configured and disposed to become compressed when the spindle is moved in a longitudinal direction along the axis of rotation into the spindle end position.

6. The simulation device according to claim 5, further comprising a housing defining in an interior portion thereof, a cavity configured to permit a user's access and in which the plurality of brake spring elements is arranged; wherein the housing is configured to accommodate a variable number of brake spring elements in the plurality of brake spring elements so that a user can select the variable number depending on the torque to be exerted by the activated screw-driving tool up to a predefined nominal torque and/or nominal angle of rotation.

7. The simulation device according to claim 6, further comprising a quick-release mechanism that is attached to the housing and configured to control the user's access to the cavity for purposes of permitting the user to selectively remove and replace the plurality of brake spring elements.

8. A method for carrying out a screw joint simulation of a screw-driving tool using a simulation device that includes a test connecting unit, a converter unit and a brake unit, the method comprising the following steps:
    coupling the screw-driving tool to the simulation device via the test connecting unit;
    activating the screw-driving tool to rotate the test connecting unit about an axis of rotation to exert a torque onto the test connecting unit;
    wherein the converter unit uses a threaded spindle connected to a threaded nut by a form fit;
    activating a retaining unit to hold the threaded nut by the form fit that permits only a longitudinal movement of the threaded nut from a nut starting position into a nut end position along the axis of rotation in a direction towards the screw-driving tool;
    using the converter unit to capture the torque exerted by the screw-driving tool and converting a rotational movement of the spindle about the axis of rotation into a longitudinal movement of the threaded nut from a nut starting position into a nut end position along the axis of rotation; and
    using the longitudinal movement of the threaded nut of the converter unit in a longitudinal direction into the nut end position to convert a rotational movement of the spindle about the axis of rotation to apply a braking force to the brake unit with a brake piston that transmits the braking force to effect a frictional engagement of a plurality of brake plate elements with each other as the nut moves toward the nut end position.

9. The method according to claim 8, further comprising:
compressing a return spring element by the threaded nut that is moved in the longitudinal direction into the nut end position;
deactivating the retaining unit to generate a return spring force exerted onto the threaded nut to move the threaded nut by the return spring force from the nut end position into the nut starting position along the axis of rotation.

10. The method according to claim 8, wherein the threaded nut that is moved in a longitudinal direction into the nut end position and the spindle are loaded against each other during rotational movement of the spindle about the axis of rotation, and the spindle is moved in a longitudinal direction from a spindle starting position into a spindle end position along the axis of rotation; wherein the spindle compresses a plurality of brake spring elements wherein upon deactivating the screw-driving tool so that torque ceases to be exerted by the deactivated screw-driving tool, then the brake spring elements become decompressed to exert a spring force that moves the spindle from the spindle end position into a spindle output position along the axis of rotation.

11. The simulation device according to claim 5, further comprising a housing defining in an interior portion thereof, a cavity in which the plurality of brake spring elements is arranged, wherein each of the plurality of brake spring elements is defined by a stiffness, wherein the housing is configured to permit a user to selectively remove and replace the plurality of brake spring elements so that the user can select the plurality of brake spring elements according to a stiffness selected to depend on the torque to be exerted by the activated screw-driving tool up to a predefined nominal torque and/or nominal angle of rotation.

12. The simulation device according to claim 11, further comprising a quick-release mechanism that is attached to the housing and configured to control the user's access to the cavity for purposes of permitting the user to selectively remove and replace the plurality of brake spring elements.

* * * * *